May 10, 1949.   P. R. SLOSAR   2,469,581
REAR BLINKER LAMP FOR AUTOMOBILES
Filed April 16, 1947
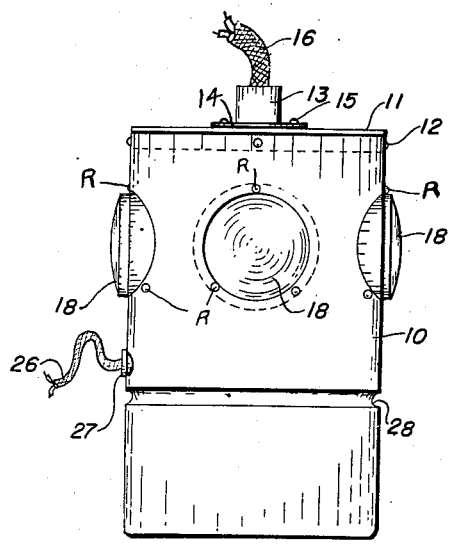
FIG. 1
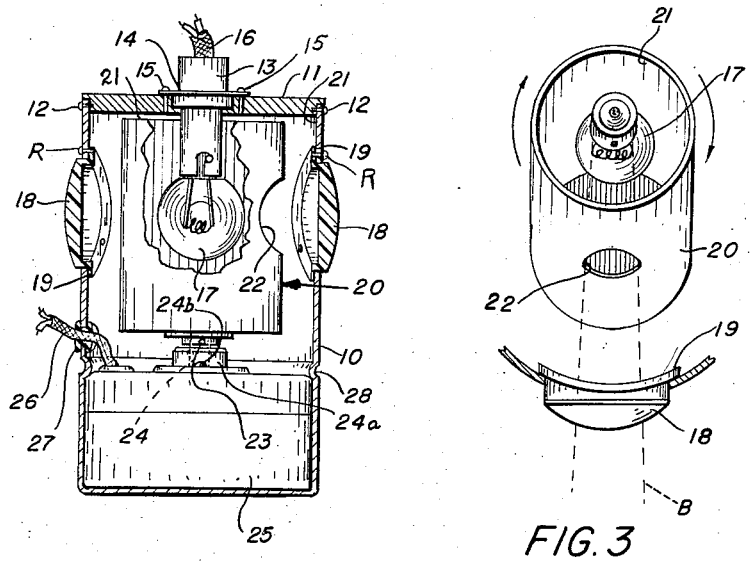
FIG. 2
FIG. 3
INVENTOR.
PAUL R. SLOSAR
BY
*H. G. Manning*
ATTY.

UNITED STATES PATENT OFFICE 2,469,581

REAR BLINKER LAMP FOR AUTOMOBILES

Paul Richard Slosar, Bridgeport, Conn.

Application April 16, 1947, Serial No. 741,777

3 Claims. (Cl. 177—329)

This invention relates to vehicles, and more particularly to a blinking signal lamp for use on all types of automobiles, trucks, airplanes, boats, etc.

One object of the present invention is to provide a device of the above nature which will give a constant blinking signal visible for great distances to warn approaching vehicles to slow down or proceed with caution.

A further object is to provide a device of the above nature which may be seen from the right or left, as well as from the rear of the vehicle.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing, one form in which the invention may conveniently be embodied in practice.

In the drawing,

Fig. 1 represents a rear view, in elevation, of the improved blinker light.

Fig. 2 is a longitudinal sectional view of the same.

Fig. 3 is a perspective view of the rotating shield and one of the lenses to show the operating relationship of the parts.

The present invention constitutes a major safety appliance for all modes of transportation, as it gives a constant blinking warning signal without overtaxing the car battery or shortening the life of the lamp bulb, as was the case when previous forms of thermostatic blinker signal devices were used.

Moreover, even if not used as a regular taillight on a vehicle, it can be of value in case of breakdowns along the highway, especially where it is impossible for the driver to pull off the road when it is necessary to make repairs.

Referring now to the drawing in which like reference numerals denote corresponding parts throughout the several views, the numeral 10 indicates an outer casing having a top closure plate 11 secured to said casing by a plurality of horizontal screws 12. Mounted in the closure plate 11 is a lamp socket 13 which is held in position by an attaching ring 14, and rivets 15. The lamp socket 13 is connected to a 2-wire electric cord 16 receiving power from any suitable source and supplying said power to a lamp bulb 17 which is detachably secured in the socket 13.

Provision is also made on the exterior of the casing 10 of one or more plastic lenses 18 preferably red in color, and having integral interior flanges 19 located within suitable apertures formed in the side of said casing.

In order to produce a constant blinking action, provision is made of an interior cylindrical rotating cup-shaped shield 20 having an open top 21, and a single circular side aperture 22 in alignment with the lamp 17 and the lenses 18. The shield 20 has at its bottom a depending sleeve 23 which is rigidly secured upon a shaft 24 journaled in a collar 24a attached, as by rivets 24b, to the casing of a motor 25 and driven at a constant speed of preferably 60 R. P. M. for best results.

Power is supplied to the motor 25 by a 2-conductor cord 26 which is led into the casing 10 through a rubber grommet 27.

In order to hold the motor 25 firmly in operating position, provision is made of an inturned locking rib 28 formed in the casing 10 at the upper end of said motor.

Operation

In operation, the insulating rubber grommet 27 will first be placed in the casing 10.

Each of the plastic lenses 18 will then be installed in position and fastened to the casing 10 by three rivets R which pass through the flanges 19 of said lenses. The cylindrical lamp shield 20 will then be affixed to the motor shaft 24 by the rivets 24b which pass through the sleeve 23.

The conductor cord 26 leading from the motor will next be passed through the grommet 27 and drawn outside the casing 10. The motor 25 and attached shield 20 may then be placed in the casing 10 and the encircling rib 28 crimped inwardly to engage said motor casing as shown in Fig. 2.

The lamp bulb 17 will then be placed in the socket 13 and finally the top closure plate 11 will be attached on the casing 10 by means of the screws 12.

While there has been disclosed in this specification one form in which the invention may be embodied, it is to be understood that this form is to be shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a blinker lamp for a vehicle, an outer fixed cup-shaped casing having a removable top and an aperture in the side thereof, a lamp depending from the top of said casing, a cylindrical shield surrounding said lamp, and having a side aperture in alignment with said lamp and the aperture of said casing, and a motor having a vertical shaft for supporting and continuously rotating said shield to produce a continual blinking action, said casing having an intermediate inturned rib located to engage the upper end of the motor to lock said motor and said shield securely as a unit in said outer casing.

2. The invention defined in claim 1, in which a colored lens is fitted in the aperture of said casing.

3. The invention defined in claim 1, in which said shield has a depending reduced sleeve, and said motor has a shaft rigidly secured in said sleeve.

PAUL RICHARD SLOSAR.

REFERENCES CITED

The following references are of record in the file of this patent:

UNITED STATES PATENTS

| Number | Name | Date |
|---|---|---|
| 1,224,695 | Willers | May 1, 1917 |
| 1,511,673 | Kraus | Oct. 14, 1924 |
| 1,768,717 | Skog | July 1, 1930 |
| 2,097,056 | Briechle | Oct. 26, 1937 |